(12) United States Patent
Lindsay et al.

(10) Patent No.: US 8,354,610 B2
(45) Date of Patent: Jan. 15, 2013

(54) HIGH QUALITY HOLE CUTTING USING VARIABLE SHIELD GAS COMPOSITIONS

(75) Inventors: Jon W. Lindsay, Hanover, NH (US); Guy T. Best, Bethel, VT (US)

(73) Assignee: Hypertherm, Inc., Hanover, NH (US)

( * ) Notice: Subject to any disclaimer, the term of this patent is extended or adjusted under 35 U.S.C. 154(b) by 0 days.

(21) Appl. No.: 13/248,949

(22) Filed: Sep. 29, 2011

(65) Prior Publication Data

US 2012/0018409 A1    Jan. 26, 2012

Related U.S. Application Data

(63) Continuation of application No. 12/341,731, filed on Dec. 22, 2008.

(51) Int. Cl.
*B23K 10/00*    (2006.01)

(52) U.S. Cl. ......... 219/121.44; 219/121.39; 219/121.55; 219/121.46

(58) Field of Classification Search .............. 219/121.36, 219/121.39, 121.44, 121.54–121.57
See application file for complete search history.

(56) References Cited

U.S. PATENT DOCUMENTS

| | | | |
|---|---|---|---|
| 5,380,976 | A | 1/1995 | Couch, Jr. et al. |
| 5,591,357 | A | 1/1997 | Couch, Jr. et al. |
| 5,614,110 | A | 3/1997 | Shintani et al. |
| 5,695,662 | A | 12/1997 | Couch, Jr. et al. |
| 5,801,355 | A | 9/1998 | Saio et al. |
| 5,893,986 | A | 4/1999 | Oakley et al. |
| 6,232,574 | B1 | 5/2001 | Oakley |
| 7,067,762 | B2 | 6/2006 | Yamaguchi et al. |
| 2005/0035093 | A1 | 2/2005 | Yamaguchi et al. |
| 2006/0186094 | A1 | 8/2006 | Krink et al. |
| 2007/0181540 | A1 | 8/2007 | Lindsay |

FOREIGN PATENT DOCUMENTS

| | | |
|---|---|---|
| CN | 1118581 A | 3/1996 |
| EP | 0 719 613 | 7/1996 |
| JP | 05-212546 | 8/1993 |
| JP | 06-508793 | 10/1994 |
| JP | 2004-351449 | 12/2004 |
| WO | 2007/089709 | 8/2007 |
| WO | 2008/044756 | 4/2008 |

OTHER PUBLICATIONS

ESAB Welding and Cutting Products: "M3 Plasma Mechanized Plasmarc Cutting Torch, Instruction Manual" Oct. 2008.
International Search Report for International Patent Application No. PCT/US2009/063346, dated Apr. 28, 2010.
Written Opinion of the International Searching Authority for International Patent Application No. PCT/US2009/063346, dated Apr. 28, 2010.
International Preliminary Report on Patentability for International Patent Application No. PCT/US2009/063346, dated Jun. 29, 2011.

(Continued)

*Primary Examiner* — Tu B Hoang
*Assistant Examiner* — Brian Jennison
(74) *Attorney, Agent, or Firm* — Proskauer Rose LLP

(57) ABSTRACT

A method and apparatus for a plasma torch system having a plasma torch tip configuration that includes a nozzle, an electrode, and a control unit for controlling a composition of the shield gas flow, such that while cutting the contour the shield gas flow comprises a first shield gas composition and while cutting the hole the shield gas flow comprises a second shield gas composition.

13 Claims, 8 Drawing Sheets

OTHER PUBLICATIONS

International Search Report for International Patent Application No. PCT/US2009/061874, dated Feb. 26, 2010.

Written Opinion of the International Searching Authority for International Patent Application PCT/US2009/061874, Feb. 26, 2010.

International Preliminary Report on Patentability for International Patent Application PCT/US2009/061874, dated Jun. 29, 2011.

Communication Pursuant to Article 94(3) EPC for EP Application 09747956.2, dated Sep. 14, 2011.

"Internal Part Feature Cutting Method and Apparatus" Specification, Drawings, Claims and Prosecution History of U.S. Appl. No. 12/466,786, filed May 15, 2009, by Jon W. Lindsay, which is stored in the United States Patent and Trademark Office.

"Method and Apparatus for Cutting High Quality Internal Features and Contours" Specification, Drawings, Claims and Prosecution History of U.S. Appl. No. 12/557,920, filed Sep. 11, 2009, by Jon W. Lindsay.

"High Quality Hole Cutting Using Variable Shield Gas Compositions" Specification, Drawings, Claims and Prosecution History of U.S. Appl. No. 12/341,731, filed Dec. 22, 2008, by Jon W. Lindsay.

| | CONTOUR CUTTING | | HOLE CUTTING | |
|---|---|---|---|---|
| | Plasma Gas | Shield Gas | Plasma Gas | Shield Gas |
| Ignition | Air | Air | Air | Air |
| Pierce | $O_2$ | Air | $O_2$ | Air |
| Cutting | $O_2$ | Air | $O_2$ | $O_2$ |

HIGH QUALITY HOLE CUTTING USING VARIABLE SHIELD GAS COMPOSITIONS

CROSS-REFERENCE TO RELATED APPLICATIONS

This application is a continuation application of and claims the benefit of U.S. patent application Ser. No. 12/341,731, file on Dec. 22, 2008, the content of which is incorporated herein by reference in its entirety.

TECHNICAL FIELD

The invention relates generally to plasma arc cutting torches. More specifically, the invention relates to a method and apparatus for cutting holes and contours in a workpiece using a plasma torch tip configuration.

BACKGROUND

Plasma cutting is commonly carried out by using a constricted electric arc to heat a gas flow to the plasma state. The energy from the high temperature plasma flow locally melts the workpiece. For many cutting processes, a secondary gas flow (also known as a shield gas flow, or shield flow) is used to protect the torch and assist the cutting process. The momentum of the high temperature plasma flow and the shield flow help remove the molten material, leaving a channel in the workpiece known as a cut kerf.

Relative motion between the plasma torch and the workpiece allows the process to be used to effectively cut the workpiece. The shield gas interacts with the plasma gas and the surface of the workpiece and plays a critical role in the cutting process. Downstream of the nozzle orifice, the plasma and shield gas flows come into contact enabling heat and mass transfer.

For reference, FIG. 1 is a diagram of a known automated plasma torch system. Automated torch system 10 can include a cutting table 22 and torch 24. An example of a torch that can be used in an automated system is the HPR260 auto gas system, manufactured by Hypertherm®, Inc., of Hanover, N.H. The torch height controller 18 is then mounted to a gantry 26. The automated system 10 can also include a drive system 20. The torch is powered by a power supply 14. An automated torch system 10 can also include a computer numeric controller 12 (CNC), for example, a Hypertherm Automation Voyager, manufactured by Hypertherm®, Inc., Hanover, N.H. The CNC 12 can include a display screen 13 which is used by the torch operator to input or read information that the CNC 12 uses to determine operating parameters. In some embodiments, operating parameters can include cut speed, torch height, and plasma and shield gas composition. The display screen 13 can also be used by the operator to manually input operating parameters. A torch 24 can also include a torch body (not shown) and torch consumables that are mounted to the front end of a torch body. Further discussion of CNC 12 configuration can be found in U.S. Patent Publication No. 2006/0108333, assigned to Hypertherm®, Inc., the entirety which is incorporated herein by reference.

FIG. 2 is a cross-sectional view of a known plasma arc torch tip configuration, including consumable parts and gas flows. The electrode 27, nozzle 28, and shield 29 are nested together such that the plasma gas 30 flows between the exterior of the electrode and the interior surface of the nozzle. A plasma chamber 32 is defined between the electrode 27 and nozzle 28. A plasma arc 31 is foamed in the plasma chamber 32. The plasma arc 31 exits the torch tip through a plasma arc orifice 33 in the front end of the nozzle. The shield gas 34 flows between the exterior surface of the nozzle and the interior surface of the shield. The shield gas 34 exits the torch tip through the shield exit orifice 35 in the front end of the shield, and can be configured to surround the plasma arc. In some instances, the shield gas also exits the torch tip through bleed holes 36 disposed within the shield 29. An example of plasma torch consumables are the consumable parts manufactured by Hypertherm®, Inc., of Hanover, N.H. for HPR 130 systems, for cutting mild steel with a current of 80 amps.

A portion of the shield gas flow can enter the cut kerf with the plasma gas and form a boundary layer between the cutting arc and the workpiece surface 37. The composition of this boundary layer influences the heat transfer from the arc to the workpiece surface and the chemical reactions that occur at the workpiece surface.

Numerous gas mixtures are used for both plasma and shield gas in plasma cutting processes. For example, oxygen is used as the plasma gas and air as the shield gas for the processing of mild steel. Some low current processes (e.g., less than 65 A) use oxygen as both the plasma gas and shield gas to cut thin material (e.g., workpieces less than 10 gauge). The oxygen plasma gas/air shield gas combination is popular for mild steel at arc currents above 50 amps, due to the ability to produce large parts with good quality and minimal dross at high cutting speeds. Such cutting processes have certain drawbacks. For example, though the oxygen plasma gas/air shield gas configuration can cleanly cut large sections with straight edges, such a gas combination is unable to create high quality holes. Instead, holes cut with oxygen plasma gas and air shield gas has a substantial "bevel" or "taper." Bevel or taper occurs where the diameter at the bottom side of the workpiece is smaller than the diameter at the top side of the plate. In a bolt hole cut using an air shield gas, if the diameter of the hole at the top of the workpiece is cut to match the size of the bolt which is to pass through the hole, the taper of the hole cut with an air shield gas may cause the hole diameter at the bottom of the workpiece to be smaller than the diameter of the bolt, preventing the bolt from passing through the bottom of the workpiece. In these types of instances, secondary processes, such are reaming or drilling is required to enlarge the diameter of the bolt hole at the bottom of the workpiece. This prior method of ensuring hole cut quality was time consuming suggesting that a more efficient method of cutting holes and contours in a single workpiece is necessary.

SUMMARY OF THE INVENTION

The present invention substantially improves the cut quality for small internal part features, or holes, while maintaining the productivity and cut quality for large features, or contours. By changing the shield gas composition when cutting a hole and a contour in a single workpiece, the present invention eliminates the need for secondary processes, For example, while cutting the contour the shield gas flow can have a first shield gas composition and while cutting the hole the shield gas flow has a second shield gas composition.

In one aspect, the invention features a method for cutting a hole and a contour in a workpiece with a plasma torch. In one embodiment the method includes a plasma torch including a nozzle and electrode that define a plasma chamber; a plasma arc is generated in the plasma chamber. In one embodiment, the plasma torch also includes a shield gas supply line for providing a shield gas flow to the plasma arc torch, and a control unit for controlling cutting parameters including cutting speed and shield gas composition. In one embodiment the method includes controlling the cutting parameters such that when the contour is cut the shield gas comprises a first shield gas composition and when the hole is cut the shield gas comprises a second shield gas composition. In some embodiments, the first shield gas composition is different than the second shield gas composition.

In still another aspect the invention features a method for improving the cutting characteristics of a small internal feature in a plasma torch cutting operation. In one embodiment the method includes the steps of cutting a small internal feature using a second shield gas composition, the small internal feature positioned within the anticipated contour cut of a workpiece, and cutting a contour corresponding to the anticipated contour cut using a first shield gas composition.

In a further aspect the invention features a method for cutting a hole and a contour in a workpiece using a plasma arc torch. The plasma arc torch can include a nozzle and electrode that define a plasma chamber, such that a plasma arc generated in the plasma chamber is used to cut the workpiece, and a shield gas supply line that delivers a shield gas flow to the plasma torch. In one embodiment, the method includes the step of cutting a hole in a workpiece wherein the shield gas flow comprises a second shield gas composition which is selected such that a bevel of an edge of the hole is substantially eliminated. In one embodiment the method can also include the steps of cutting a contour wherein the shield gas flow comprises a first shield gas composition, and controlling the first shield gas composition and the second shield gas composition such that while cutting the hole the second shield gas composition comprises less nitrogen than the first shield gas composition.

In another aspect, the invention features a further method of cutting a hole in a workpiece using a plasma arc torch. The method can include a plasma arc torch including high-current consumables, the high-current consumables including a nozzle and electrode that define a plasma chamber. In one embodiment the method can also include the steps of generating a plasma arc in the plasma chamber using an arc current above 50 amps, and controlling a shield gas composition of a shield gas flow such that when the hole is being cut the shield gas composition comprises an amount of nitrogen such that any potential bevel of the side wall of the hole is substantially eliminated.

The invention features, in one aspect, a plasma torch system for cutting a hole and contour in a workpiece. In one embodiment the plasma torch system includes a plasma torch tip configuration including a nozzle and an electrode that defines a plasma chamber, a plasma arc is generated in the plasma chamber. In one embodiment the plasma torch system also includes a shield gas supply line for providing a shield gas flow to the plasma torch tip and a control unit for controlling a composition of the shield gas flow. In one embodiment the control unit controls the composition of the shield gas flow such that while cutting the contour the shield gas flow comprises a first shield gas composition and while cutting the hole the shield gas flow comprises a second shield gas composition. In one embodiment the improvement comprises a computer readable product tangibly embodied in an information carrier, operable on the control unit, the computer readable product containing cutting information for the plasma arc torch system including instructions that select the first shield gas composition when cutting the contour and select the second shield gas composition when cutting the hole.

In another aspect, the invention features a component that includes a computer readable product tangibly embodied in an information carrier, operable on a CNC for use in a plasma torch system. In one embodiment the computer readable product includes cutting information for cutting a hole and a contour from a workpiece using a plasma arc torch, including instructions such that while cutting the hole a shield gas flow comprises a second shield gas composition and when the contour is cut the shield gas flow comprises a first shield gas composition.

In still another aspect, the invention features a computer numerical controller for controlling cutting parameters of a plasma torch including a composition of a shield gas flow. In one embodiment the controller includes a processor, an electronic storage device, an interface for providing control instructions to a plasma arc torch, and a look up table for selecting the composition of the shield gas flow for the plasma torch. In one embodiment the controller controls the composition of the shield gas flow according to whether the plasma torch will cut a hole or a contour in a workpiece.

Any of the aspects above can include one or more of the following features. The second shield gas composition can comprise less nitrogen than the first shield gas composition such that a bevel of an edge of the hole is substantially eliminated. In some embodiments the workpiece is mild steel, in some embodiments the first shield gas composition is air, and in some embodiments the second shield gas composition is oxygen. The second shield gas composition can also consist essentially of oxygen during hole cutting. In one embodiment a flow rate of the shield gas flow is reduced during hole cutting. A cutting speed of the torch can be reduced during hole cutting. In one embodiment, controlling the cutting parameters can further comprise controlling the second shield gas composition according to a ratio of a diameter of the hole to a thickness of the workpiece. The ratio can be less than or equal to 2.5. In some embodiments the ratio is less than or equal to 1. In some embodiments the ratio is less than or equal to 0.7 and/or limited by the size of the pierce penetration.

Any of the aspects above can also include one or more of the following features. In one embodiment controlling the cutting parameters can include current ramping sequences for arc termination where the ramping is constant for both contour cutting and hole cutting. The step of controlling the cutting parameters can also further comprise controlling an amount of nitrogen in the shield gas flow such that the second shield gas composition contained less nitrogen as a percentage of the total volume than the first shield gas composition whereby a bevel of an edge of the hole is substantially reduced.

Any of the aspects above can also include one or more of the following features. In one embodiment a method can include the step of providing a computer readable product tangibly embodied in an information carrier, operable on a CNC for use with a plasma torch system, the computer readable product containing cutting information for the plasma arc torch including instructions that select the first shield gas composition when cutting the contour and select the second shield gas composition when cutting the hole. In some embodiments the second shield gas composition can be selected according to a ratio of the diameter of the hole to the thickness of a workpiece. And in some embodiments the cutting information include instructions such that when a hole is cut the control unit controls the second shield gas composition according to a ratio of a diameter of the hole to a thickness of the workpiece.

One advantage of the present invention is that it produces high quality plasma cut holes, while maintaining productivity and dross levels typically achieved on contour cuts. Another advantage of the present invention is that it also minimizes impact on overall part cost by limiting the use of more expensive shield gas mixtures to short duration hole cuts.

A further advantage of the present invention is that it improves time efficiency by allowing the operator to use a single configuration of torch consumables when cutting holes and contours in a single workpiece, while simultaneously preventing the quality deterioration seen when using the prior cutting technique of a single shield gas for both hole and contour cutting.

The foregoing and other objects, aspects, features, and advantages of the invention will become more apparent from the following description and from the claims.

BRIEF DESCRIPTION OF THE DRAWINGS

These and other features will be more fully understood by reference to the following detailed description when taken in conjunction with the accompanying drawings, which are illustrative and not necessarily to scale.

DETAILED DESCRIPTION

In the present invention, a first shield gas composition is used when cutting the contour, and a second shield gas composition is used when cutting one or more holes or small internal feature in a single workpiece while using a single plasma torch consumable configuration.

Figure 3:
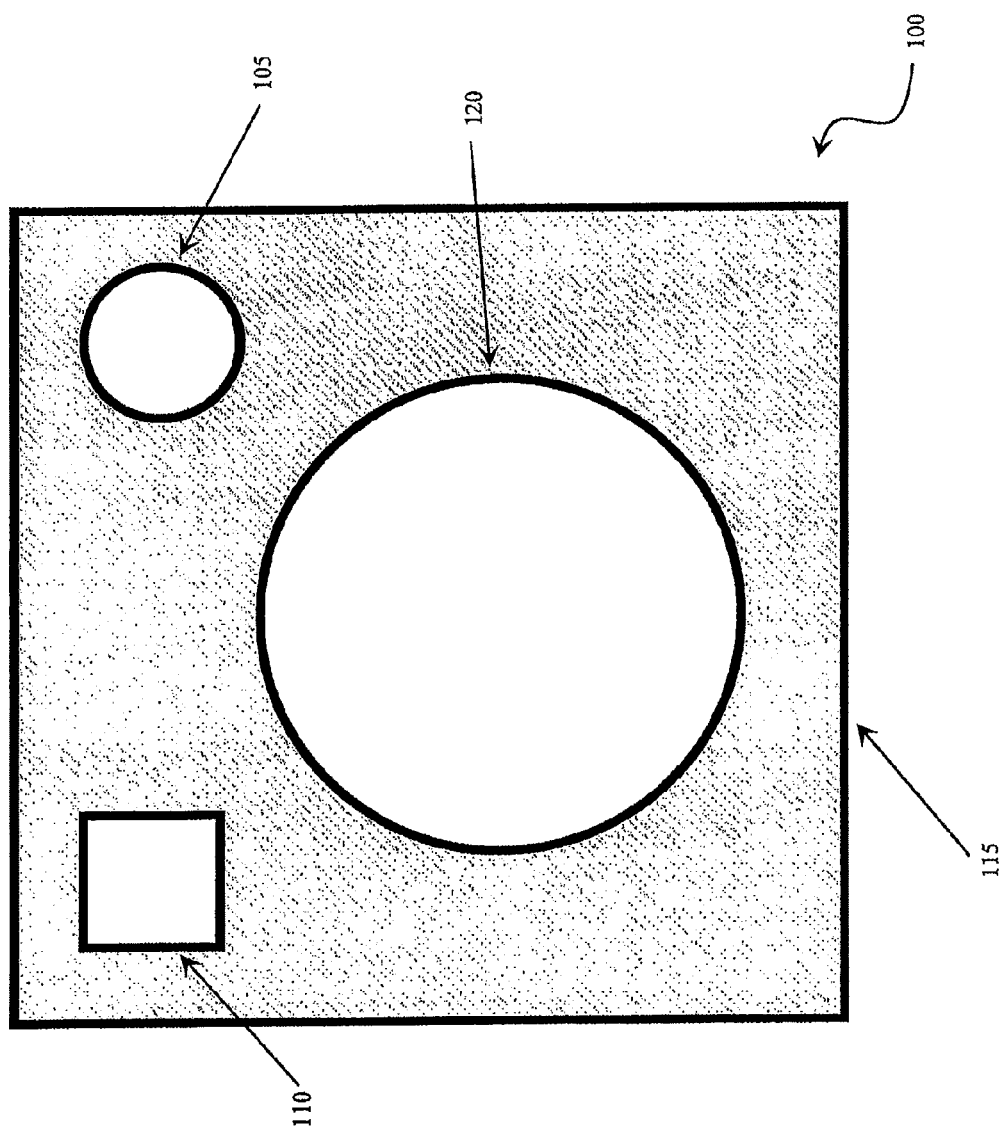
FIG. 3 is a sample workpiece showing anticipated hole and contour cut outlines.

As used herein, a hole is a shape having a diameter (or dimension) to workpiece (plate) thickness ratio of approximately 2.5 or smaller. Referring to FIG. 3, by way of example, shows a 6×6 inch square piece of 0.5 inch thick plate steel 100 that in one embodiment, could be cut from a larger workpiece (not shown). A 1 inch diameter hole 105 in the 0.5 inch thick plate of steel 100 would have a ratio of 2. A hole, as used herein, can be categorized as a small internal part features that are not necessarily round, but where a majority of the features have dimension that are about 2.5 times or less than the thickness of the materials, for example a 1 inch square 110 in the V2 inch plate steel 100. All other features, are referred to herein as contours which can include both straight 115 or curved 120 cuts.

Figure 4:
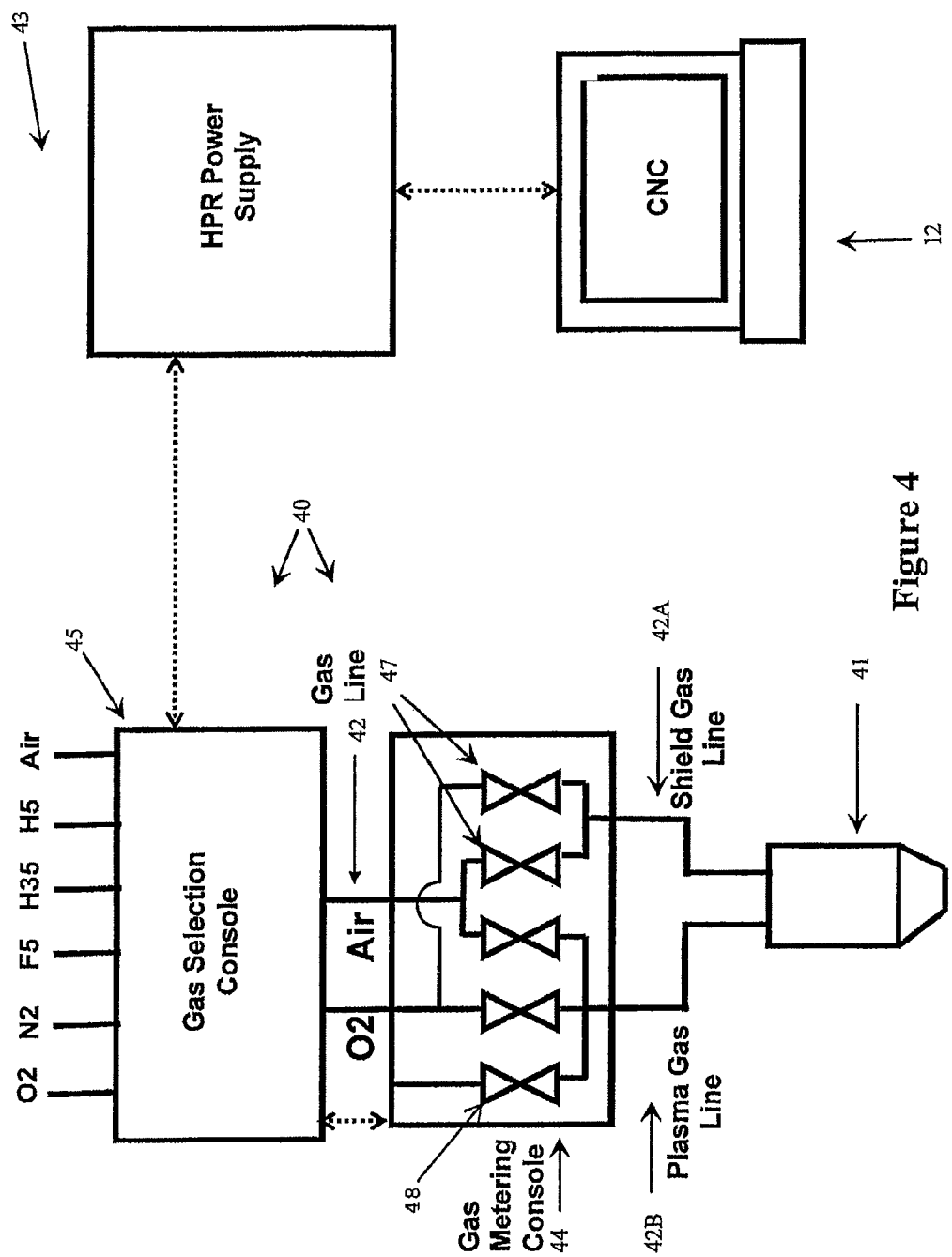
FIG. 4 is a block diagram of a plasma arc torch system with a proposed gas system.

A torch system configuration that can be used with one embodiment is shown in FIG. 4. In one embodiment, the shield gas composition for cutting a hole is $O_2$. In some embodiments, the shield gas composition selected when cutting a hole contains less nitrogen than the shield gas composition used when cutting the contour. In some embodiments, the shield gas composition used when cutting a hole can include He, $N_2$, $O_2$, or combinations thereof.

Figure 1:
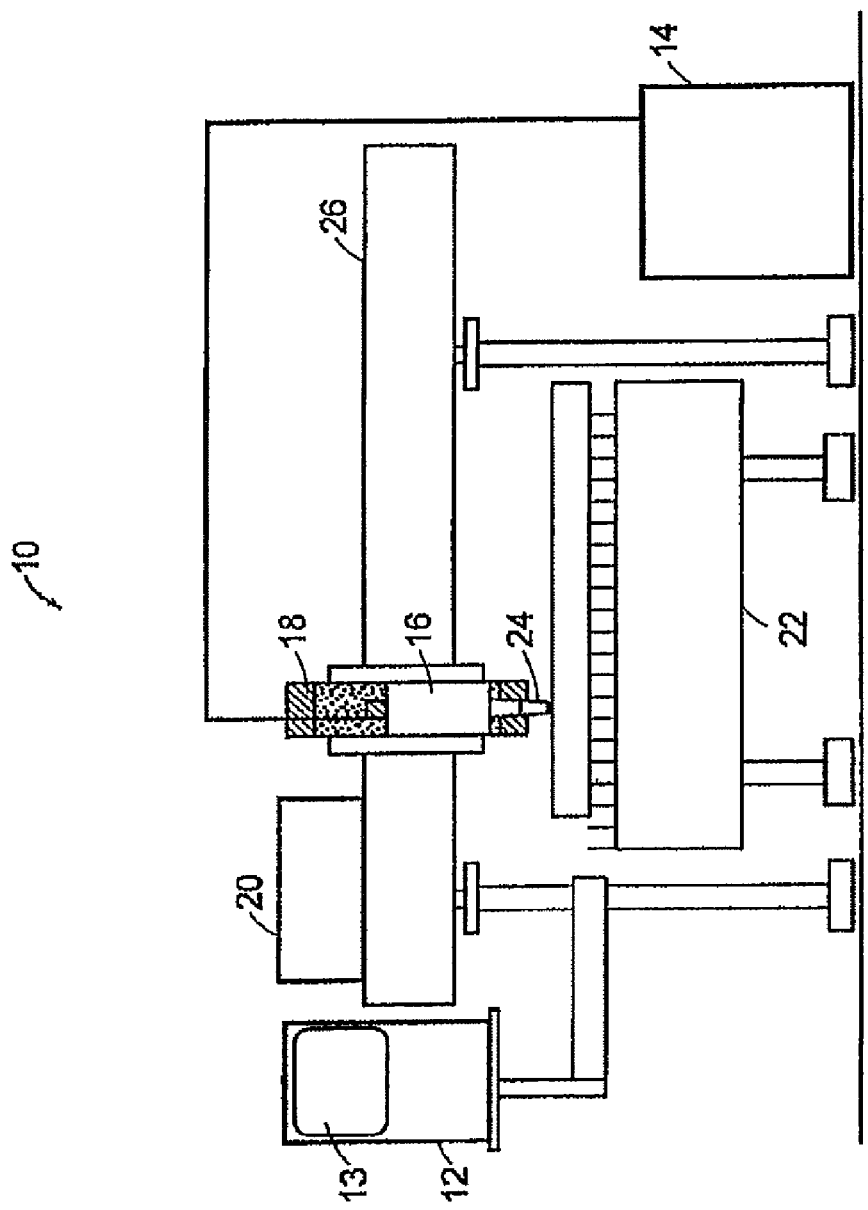
FIG. 1 is a diagram of a known mechanized plasma arc torch system, showing a torch mounted on a table.
Figure 2:
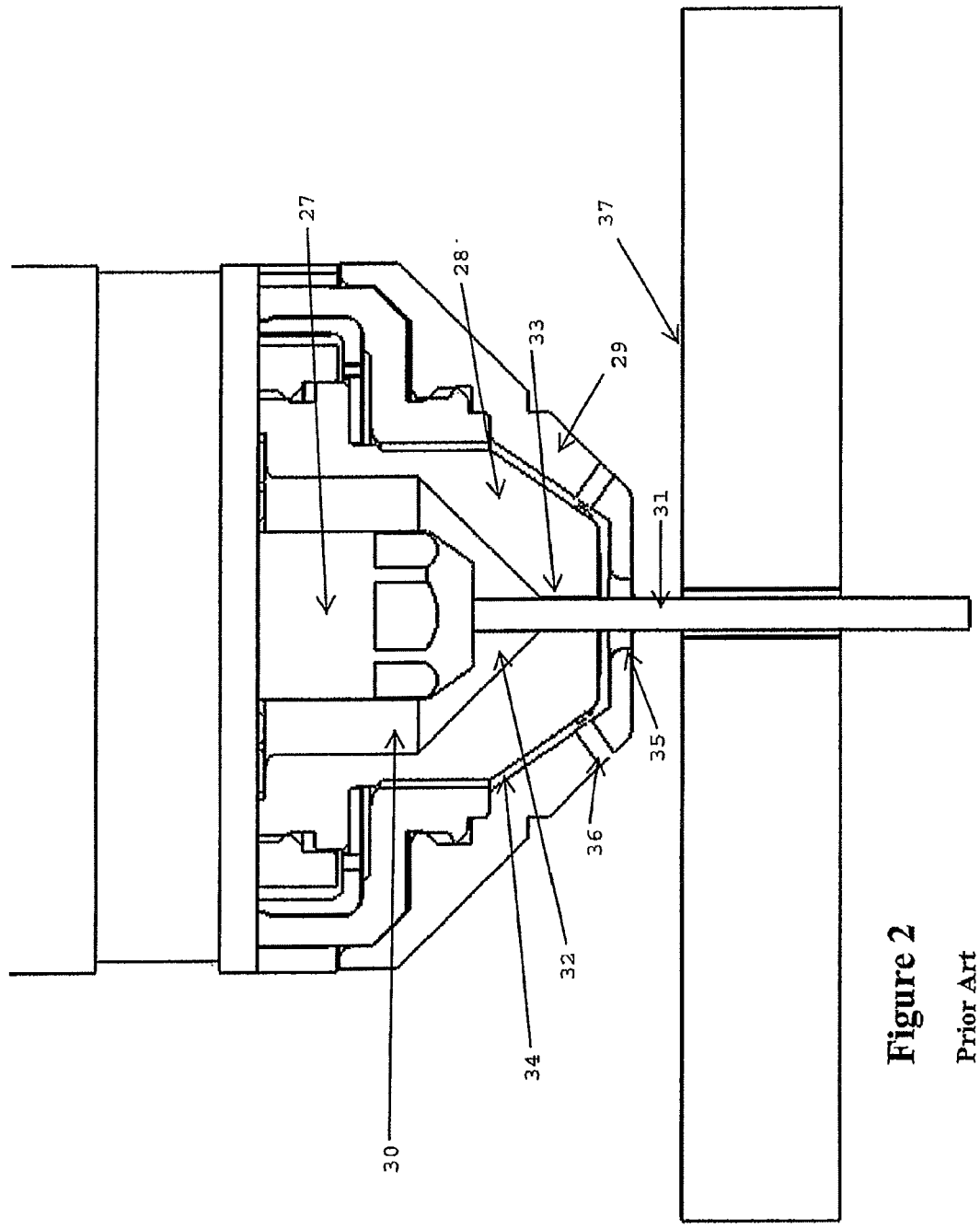
FIG. 2 is a cross sectional view of a known plasma arc torch tip.

FIG. 4 is a block diagram of a plasma arc torch system including an automatic gas control system according to an embodiment of the invention. The plasma torch system can include all of the elements described above in connection with FIG. 1. Additionally, the torch system can include a gas console 40 that provides plasma and shield gas to the plasma arc torch 41. The plasma gas and the shield gas flows from the gas console 40 through gas supply lines 42 to, in some embodiments, a gas selection consol 45 and a gas metering consol 44 allows for the mixing of different types of gases, before the gas mixture continues to the plasma torch 41. The gas selection consol 45 allows the selection and mixing of one of a plurality gases, the selected gases can then be metered by the gas metering console 44. The gas consol can receive gas inputs including: oxygen, nitrogen, F5, H35, H5, and air. The gas metering consol 44 can then measure the plasma gas and shield gas. This control configuration allows for the plasma system to rapidly change the required shield gas or gas mixture for hole piercing, hole cutting, or contour cutting. For example, when cutting a hole, in one embodiment of the present invention, the gas consol 40 provides air as the shield gas during the piercing process and when the piercing of the metal plate is complete, the gas consol 40 automatically switches the shield gas to $O_2$ for hole cutting. When the plasma system moves to cut a contour, the gas consol 40 can switch the shield gas back to air as the shield gas for both the piercing and cutting processes. Such rapid switching can be directed by code or programming in the CNC 12.

The gas supply line 42 that carry the shield gas flow are referred to as shield gas supply line 42A in some embodiments. And in some embodiments, the gas supply line that carry plasma gas flow are referred to as plasma gas supply line 42B. In some embodiments, the composition of the plasma gas flow is controlled using valves 47. In some embodiments the valves 47 are on-off solenoid valves, and in some embodiments the valves are variable solenoid valves. In some embodiments, the plasma and shield gas can be $O_2$, Air, He, $N_2$ or some combination thereof. The gas metering console 44 can also include a venting valve 48 which can also be an on/off valve or a solenoid valve. In some embodiments, the vent valve 48 is used to enable rapid switching of the plasma gas and shield gas.

The CNC 12 can be any computer that controls a plasma torch system. A CNC 12 can have a processor, electronic storage device, and an interface for providing control instructions to a plasma arc torch. The storage device can be internal or external and can contain data relating to the part to be cut in the workpiece. In other embodiments, the CNC 12 can be manually programmed, and in some embodiments the CNC 12 can include a computer readable product that includes computer readable instructions that can select or configure operating parameters of the plasma torch system.

An example of computer readable instructions is below. The instructions correspond to a round hole cut into a square contour cut using a Hypertherm Automation Voyager CNC controller with an HPR 260 Autogas Console, all manufactured by Hypertherm, Inc. of Hanover, N.H. In the exemplary code below used with the Hypertherm Automation CNC controllers, the code provides two separate cut charts for the hole (G59 V503 F1.01 through G59 V507 F31) and for the contour (G59 V503 F1 through G59 V507 F31). In some embodiments, other forms of code, or computer readable instructions can be used with one or more cut charts to provide a similar, or even identical final output. Notably, the left column contains the referenced code lines; the right column provides general a generic explanation of the instructions contained in each code line.

| | |
|---|---|
| G20 | English units are sets |
| G91 | Incremental programming mode |
| G59 V503 F1.01 | Load a custom cut chart for a hole |
| G59 V504 F130 | " |
| G59 V505 F3 | " |
| G59 V507 F31 | " |
| G00X1.7500Y-1.7500 | Move to hole center |
| M07 | Plasma start |
| G03X-0.0970I-0.0485 | Hole motion |
| G03X0.0015Y0.0168I0.0970 | " |
| G03X0.0212Y-0.0792I0.0955J-0.0168 | " |
| M08 | Plasma stop |
| G59 V503 F1 | Load cut chart for contour cut |
| G59 V504 F130 | " |
| G59 V505 F2 | " |
| G59 V507 F31 | " |
| G00X-1.6757Y1.5624 | Move to contour start location |
| M07 | Plasma start |
| G01X0.2500 | Contour motion |
| G01X3.0000 | " |
| G01Y-3.0000 | " |
| G01X-3.0000 | " |
| G01Y3.0000 | " |
| G01Y0.2500 | " |
| M08 | Plasma stop |
| M02 | End of program |

In some embodiments the computer readable products are referred to as cut charts. In some embodiments, the computer readable product (not shown), or cut charts, contains cutting information including instructions that select a first shield gas when the torch 41 is cutting a contour in a workpiece and select a second shield gas composition when the torch is cutting a hole in the same workpiece. In some embodiments, the cut chart contains information that selects the shield gas composition based on the type of cut, that is a contour cut or a hole cut. In some embodiments, the CNC is able to rapidly switch from one shield gas to another depending on the instructions contained in the cut chart. In some embodiments, the torch operator selects the shield gas composition and the CNC 12 only provides signals to control, for example, the plasma gas supply line valves 44 based on the information input from the torch operator.

In some embodiments, the torch operator selects a cutting program that includes both hole and contour cutting instructions. And in some embodiments an operator selects a hole cut chart and a contour cut chart that are designed to execute consecutively. In some embodiments, the hole cut will be positioned within the contour cut anticipated by the CNC 12 on the workpiece. When a cutting program includes instructions for both hole cuts and contour cuts, the cut chart will include further instructions such that the hole is cut first using a second shield gas composition and then the contour cut is cut using a first shield gas composition. Cutting the holes first within a profile of the anticipated contour cut prevents movement of the workpiece while the holes are being cut, thus eliminating deviations that would occur if the contour cuts of the part were cut first and the holes cut second.

In other embodiments, the computer readable product is nesting software, such as is made by MTC of Lockport, N.Y. Nesting software can provide code that designates when the first shield and second shield gases are to be used based upon CAD drawings of the part to be cut. The nesting software can use the CAD drawing to identify the holes or small internal features based upon the ratio of hole diameter to the thickness of the workpiece. The nesting software can then provide instructions to the CNC 12 so that the first shield gas is used when cutting contours and the second shield gas is used when cutting holes. Alternatively, the CNC can include software that selects the appropriate shield gas, for hole cutting and contour cutting without being provided instructions from the nesting software.

Figure 5:
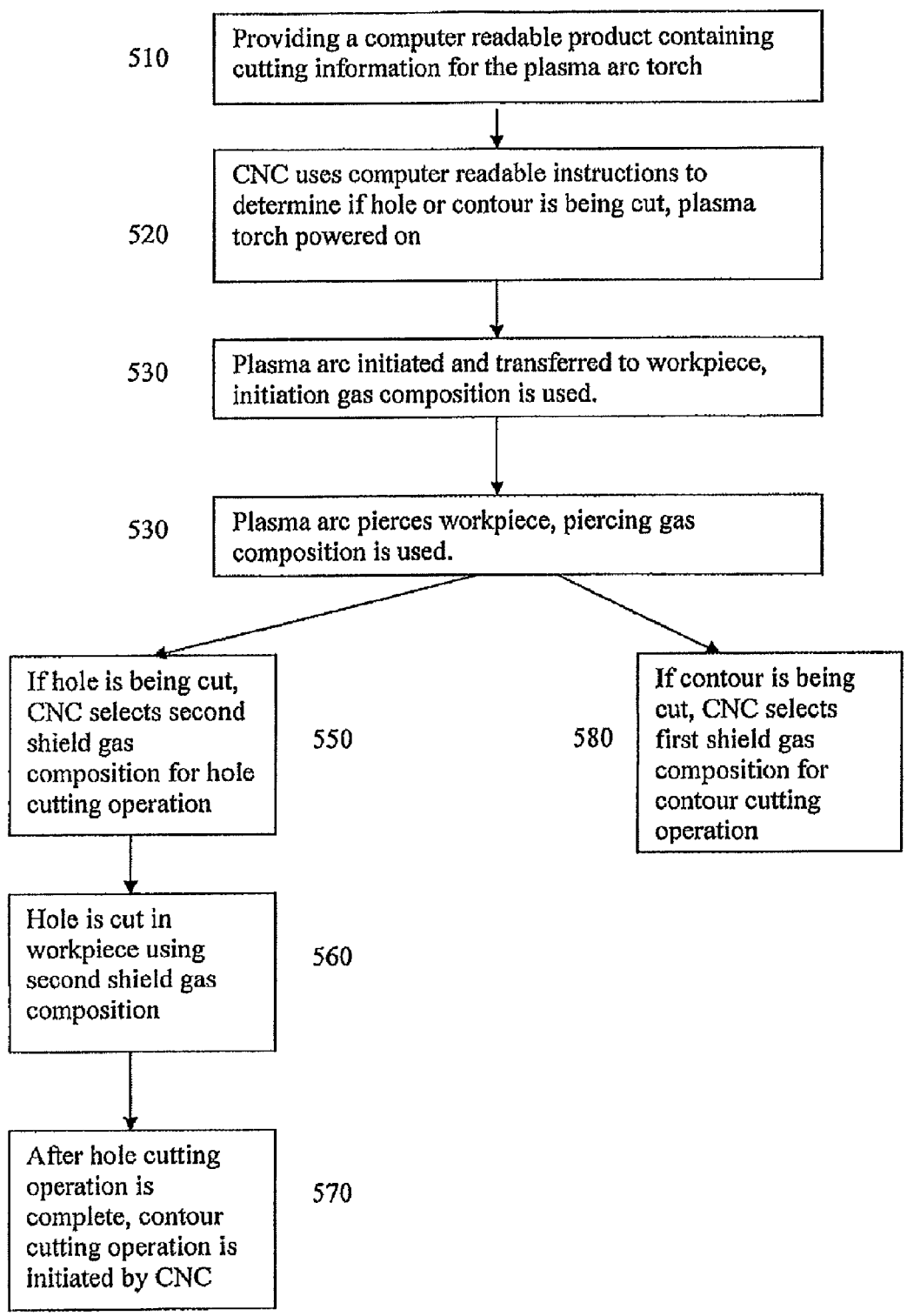
FIG. 5 is a flow diagram that shows how gas flows can be manipulated according to an embodiment of the invention.

FIG. 5 is a flow chart depicting how a processor, such as a computerized numeric controller (CNC), can be used to manipulate gas flows to implement principles of the invention. FIG. 5 shows an embodiment of the flow operations that can be contained within a computer readable product which is embodied in an information carrier. Other embodiments are also within the scope of the invention. As shown in FIG. 5, a CAD file containing the part to be cut is provided to the CNC 510, or nesting software, and based on instructions contained in the cut chart the CNC selects the shield gas composition. In another embodiment, instructions contained in the nesting software determine the shield gas composition. In some embodiment, once the CNC uses the computer readable instructions to determine if a hole or contour is being cut, the torch is powered on 520 and the arc is transferred to the workpiece 530. When the arc is initiated, the initiation shield and plasma gas is used, for example the combinations shown in FIG. 7. After the arc is transferred to the workpiece, the torch is lowered to the workpiece and the arc pierces the workpiece 530. In one embodiment, the arc pierces the workpiece using air as the pierce shield gas. Once the pierce step is completed, the CNC uses the computer readable instructions to select the appropriate shield gas depending on whether a hole or a contour is to be cut. In some embodiments, the determination as to whether a hole or a contour is to be cut (and selection of the appropriate shield gas composition) is based on an examination of the dimensions of the hole in relation to the thickness of the workpiece. In one embodiment, if the diameter of the hole is about 2.5 times or less than the thickness of the workpiece, then a hole is to be cut, and the CNC selects the second shield gas 550. In some embodiments the shield gas composition selected for hole cutting is $O_2$; and in some embodiments the shield gas composition is $O_2$, He, $N_2$, or a combination thereof. In some embodiments, the instructions regarding the shield gas compositions are included in the instructions on the cut chart. Once the second shield gas is selected, the CNC will control the shield gas flow such that the second shield gas composition flows through the shield gas supply lines. The hole is then cut 560 in the workpiece using the second shield gas composition as determined by the instructions contained in the cut chart, or designated by the nesting software. After one or more holes are cut in the workpiece, the CNC initiates the contour cutting operations 570. When the CNC initiates the contour cutting operation, the arc is again initiated 530 using the initiation shield and plasma gas for contour cutting. The arc then pierces the workpiece 540, and as the contour cutting begins, the CNC selects the first shield gas for the contour cutting operation 580.

If it is determined that a contour is being cut, then the CNC selects the first shield gas composition for the contour cut 580. The identification of a contour can be selected based on the shape of the cut or in the case of an internal feature, it may be based on a ratio of the diameter of the opening to be cut to the thickness the workpiece. In some embodiments when cutting a contour the arc initiation, the piercing of the workpiece, and the contour cut are all performed using a single shield gas composition, that is, the first shield gas composition. In some embodiments, the shield gas during the arc initiation and the piercing of the workpiece is different than the shield gas used when cutting the contour shape in the workpiece.

Figures 6, 7:
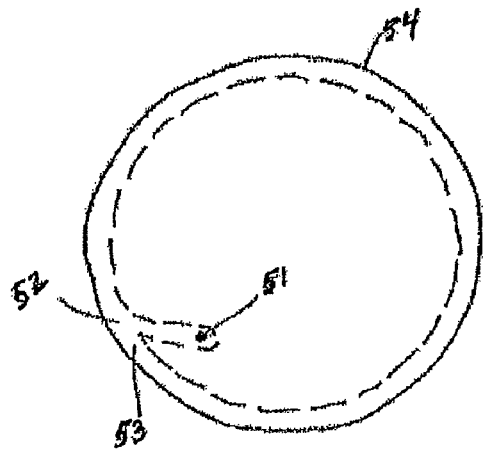
FIG. 6 depicts a movement path during a hole cutting operation.
FIG. 7 is a table illustrating different gas combinations that can be used with an embodiment of the invention for cutting mild steel.

When cutting a hole or contour in a workpiece, the same operational steps can be followed, although different shield gas compositions may be selected for each step. FIG. 6 shows an exemplary movement path followed during hole cutting, the movement path is traced out along the top of a workpiece. First, the plasma gas and shield gas flow are initiated, along with the arc current. The initiation of the gas flows and the current arc can vary depending on the consumable and torch configuration being used by the operator. U.S. Pat. No. 5,070,227, U.S. Pat. Nos. 5,166,494, and 5,170,033, all assigned to Hypertherm®, Inc. and incorporated herein by reference in their entireties, describe various gas flow and current settings that can be used during initiation, operation, and shut-down of the plasma arc, and cutting process. After the plasma arc is initiated, it is transferred to the workpiece. Once the arc is transferred to the workpiece, in some embodiments, the torch height is lowered using the torch height controller. A hole cut is begun in a workpiece by first piercing the workpiece using the plasma arc. Once the workpiece is pierced through by the plasma arc, the shield gas is switched to a second shield gas the composition of which can be optimized for hole cutting. In some embodiments the torch will begin to translate across the workpiece to cut the hole into the workpiece along the hole cut pattern which can be, in some embodiments, determined by the part drawing plasma and shield. FIG. 6 shows an exemplary embodiment including the piercing position 51, the circling start position 52, the circling end position 53, and the edge 54 of the hole cut in the workpiece.

FIG. 7 is a table illustrating examples of gas combinations that can be used with an embodiment of the invention. In one embodiment, the gases are selected to provide optimal gas cutting properties based upon the plasma torch operation, such as hole or contour cutting to be performed. The gases being shown in this figure are for mild steel cutting applications. Though the present invention can be used in cutting other materials, different shield gases can be better suited for such materials. In some embodiments, a mixture of He and $N_2$ can be used in place of oxygen for the hole shield gas cutting stainless steel or aluminum.

In the embodiment demonstrated in FIG. 7, while cutting either a contour or a hole, the system provides air as the plasma gas and the shield gas during plasma arc initiation. Air is used as the plasma gas because it tends to provide better consumable life compared to $O_2$ during arc initiation. Once the arc is initiated and transferred to the workpiece, the plasma gas is changed to $O_2$ and the shield gas remains as air for the piercing process. In this instance, the plasma gas is switched to the gas that is appropriate for the nozzle design, in this embodiment $O_2$, in order to prevent damage to the nozzle as the current is ramped up to the cutting current. In most cases it is desirable that the cutting gas be present at the time full cutting current is reached. The shield gas for the piercing process, on the other hand, remains as air. Air shield gas for piercing operations has been shown to leave a smaller pierce penetration which limits waste in the workpiece. Once the workpiece is pierced, the plasma torch will begin cutting along the edge of the penetration with the motion of the torch. It is important to distinguish between piercing and cutting. In piercing, the torch is generally stationary and the object is to make a penetration completely through the workpiece. Cutting, on the other hand, involved moving the torch by severing exposed edges to create the desired shape.

Referring again to the table of FIG. 7, after the piercing step, the shield gas can be selected based upon the type of cut: a contour or a hole. In cutting a contour, the shield and plasma gas remain unchanged. The combination of $O_2$ plasma gas and air shield gas allows straight dross free edges and fast cut speeds when cutting contours using an $O_2$ plasma gas and air shield gas combination, however, tends to create a hole with a large degree of taper or bevel, creating a poor quality hole. By keeping $O_2$ as the plasma gas and switching the shield gas also to $O_2$ when cutting holes or small internal features, the taper of the hole can be reduced if not eliminated. Taper is reduced by using an $O_2$ shield gas when cutting mild steel compared to air because the amount of nitrogen in the shield gas is reduced. Thus, other gases or gas compositions with low nitrogen content could be used in the embodiment in FIG. 7. In other embodiments, a shield gas with different composition combinations can be used when cutting holes.

Figure 8A:
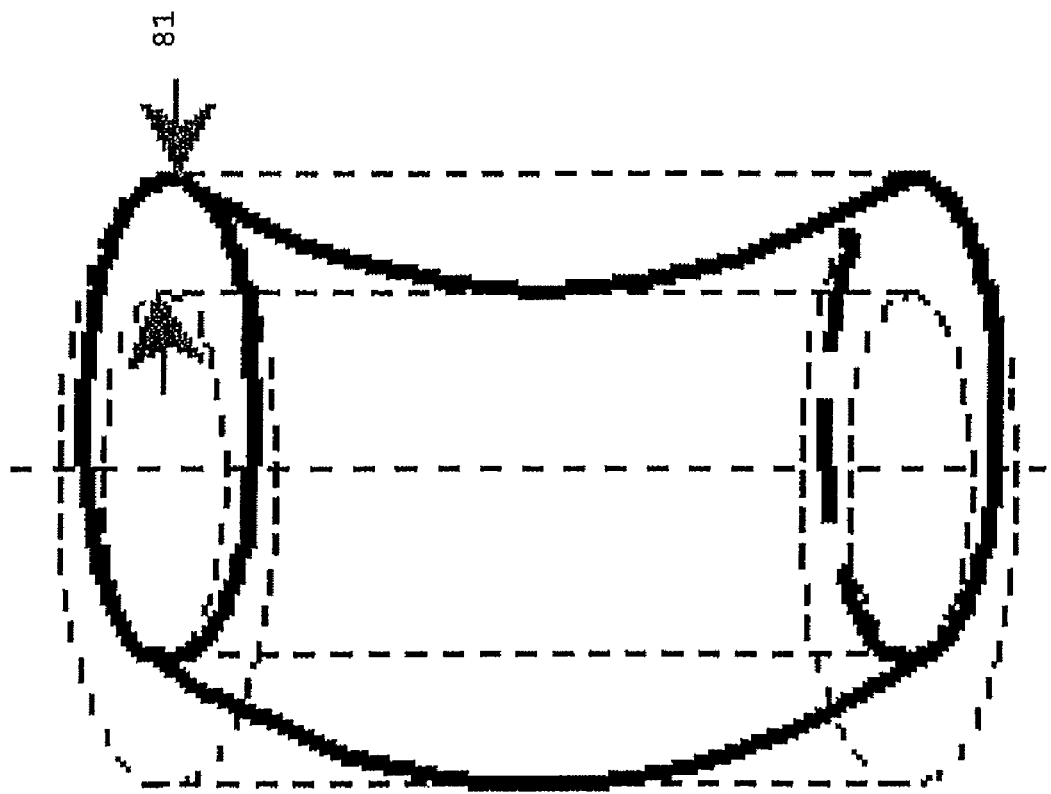
FIG. 8A is an illustration of tolerance measurements used to determine cylindricity of a hole.

As mentioned previously, the shield gas composition has been found to affect the taper, or bevel, of the edge of a hole cut that is being performed. The bevel can be measured by the cylindricity of the completed hole cut. Cylindricity is defined as a tolerance zone that is established by two concentric cylinders between which the surface of a cylindrical hole must lie as illustrated in FIG. 8A. In FIG. 8A the tolerance zone can be defined as the space between the two arrows 81. The smaller the tolerance zone, the more the surface represents a perfect the cylinder. A large taper or bevel in a hole, on the other hand, will result in a large tolerance zone. Cylindricity of a hole can also be measured using a coordinate-measuring machine ("CMM").

Figure 8B:
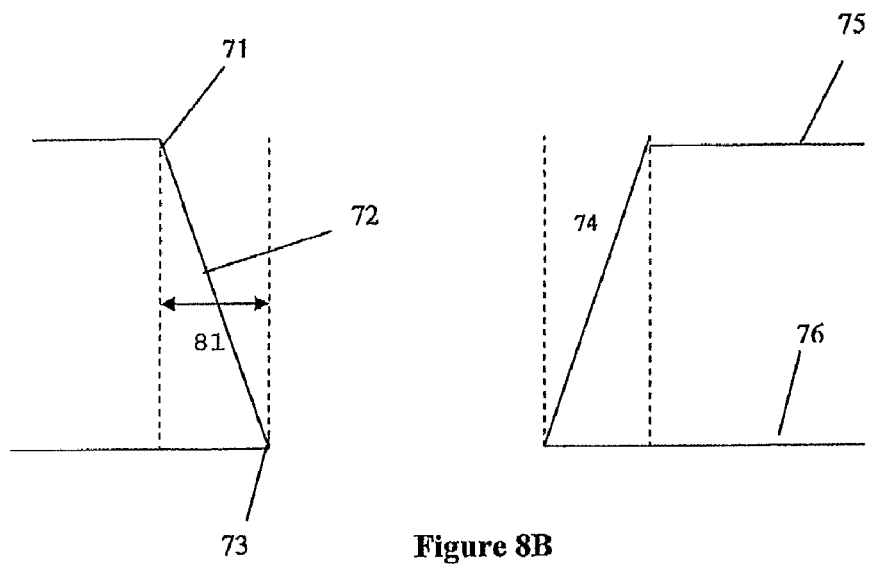
FIG. 8B is a cross section of a hole cut with the prior art cutting process.

FIG. 8B is another example of a cross sections of a hole cut using prior art cutting processes, that is, using the same shield gas composition for both a contour cut and a hole cut in the same workpiece. In FIG. 8B the cylindricity ("taper" or "bevel") of the hole can be measured by forming concentric cylinders with a diameter equal to the diameter measurement at the top 71, middle 72, and bottom 73 of the edge 74 of the hole. The greatest difference between the diameters is illustrated by the space between the arrows 81. The large difference between the radiuses of the two datum cylinders in FIG. 8B indicates a poor quality hole. Such holes can require significant post cutting treatment.

Figure 9:
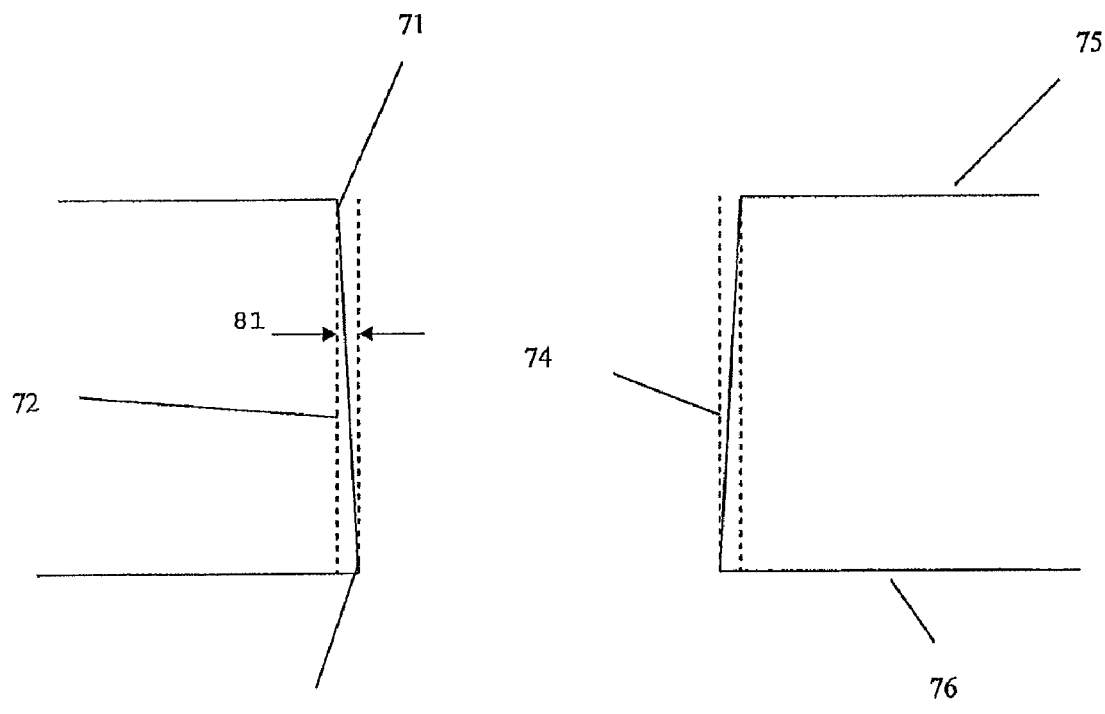
FIG. 9 is a cross section of a hole cut with an embodiment of the present invention.

FIG. 9 is a cross section of a hole cut with an embodiment of the present invention. In FIG. 9 the cylindricity ("taper" or "bevel") of the hole can be measured also by forming concentric cylinders with a diameter equal to the diameter measurement at the top 71, middle 72, and bottom 73 of the edge 74 of the hole. In FIG. 9, it can be seen that the bevel or taper of the edge of the hole cut is significantly reduced as compared to the bevel of the hole edge in FIG. 8A and FIG. 8B. Further, the reduced cylindricity can also be seen by the reduced distance between the arrows 81 as compared to FIGS. 8A and 8B. With the reduced bevel or taper of the edges of the hole, the cylindricity tolerance zone between the two concentric cylinders is minimal and resulting in a much higher quality hole, requiring no post cutting treatment.

While the invention has been particularly shown and described with reference to specific embodiments, other aspects of what is described herein can be implemented in cutting systems of ordinary skill in the art. It should be understood by those skilled in the art that various changes in form and detail can be made without departing from the spirit and scope of the invention as defined by the appended claims.

What is claimed is:

1. A method for cutting a hole and a contour in a workpiece, the method comprising:
providing a plasma arc torch having a nozzle and an electrode that define a plasma chamber in which a plasma arc is generated, a shield gas supply source for providing a shield gas flow to the plasma arc torch, and a control unit for controlling cutting parameters including shield gas composition and a cutting speed;

cutting the hole with the plasma arc torch while using the control unit to control the cutting parameters for a second shield gas composition and a second cutting speed changing the shield gas composition from the second shield gas composition to a first shield gas composition, the second shield gas composition containing less nitrogen as a percentage of a total shield gas volume than the first shield gas composition; and cutting the contour with the plasma arc torch at a first cutting speed without changing the nozzle and electrode by using the control unit to control the first shield gas composition and the first cutting speed, the second cutting speed being slower than the first cutting speed.

2. The method of claim 1 wherein controlling the cutting parameters further comprises controlling the second shield gas composition according to a ratio of a diameter of the hole to a thickness of the workpiece.

3. The method of claim 2 wherein the ratio is less than or equal to 2.5.

4. The method of claim 1 further comprising:
providing a non-transitory computer readable product tangibly embodied in an information carrier, operable on a CNC for use with a plasma torch system, the computer readable product containing cutting information for the plasma arc torch including instructions that select the first shield gas composition when cutting the contour and select the second shield gas composition when cutting the hole.

5. The method of claim 4 further comprising selecting the second shield gas composition according to a ratio of a diameter of the hole to a thickness of a workpiece.

6. A plasma torch system for cutting a hole and contour in a workpiece, the plasma torch system comprising:
a plasma torch tip configuration including a nozzle and an electrode, the nozzle and electrode defining a plasma chamber in which a plasma arc is generated;
a shield gas supply source for providing a shield gas flow to the plasma torch tip; and
a control unit for controlling a composition of the shield gas flow, the improvement comprising:
a non-transitory computer readable product tangibly embodied in an information carrier, operable on the control unit, the computer readable product containing cutting information for the plasma arc torch system including instructions that select a first shield gas composition and a first cutting speed when cutting the contour and select a second shield gas composition and a second cutting speed when cutting the hole, wherein the second shield gas composition contains less nitrogen as a percentage of a total shield as volume than the first shield gas composition and the second cutting speed is slower than the first cutting speed.

7. The plasma torch system of claim 6 wherein second shield gas composition comprises less nitrogen than the first shield gas composition such that a bevel of an edge of the hole is substantially eliminated.

8. The plasma torch system of claim 6 wherein the workpiece is mild steel, the first shield gas composition is air, and the second shield gas composition is oxygen.

9. The plasma torch system of claim 6 wherein the second shield gas composition consists essentially of oxygen during hole cutting.

10. The plasma torch system of claim 6 wherein second shield gas is composed of one or more of helium, oxygen, and nitrogen.

11. The plasma torch system of claim 6 wherein the first shield gas composition is air.

12. A component comprising:
a non-transitory computer readable product tangibly embodied in an information carrier, operable on a CNC for use in a plasma torch system, the computer readable product comprising cutting information for cutting a hole and a contour from a workpiece using a plasma arc torch, such information including instructions such that while cutting the hole, a shield gas flow comprises a second shield gas composition and a cutting speed comprises a second cutting speed, and when the contour is cut, the shield gas flow comprises a first shield gas composition and the cutting speed comprises a first cutting speed, the second shield gas composition comprising less nitrogen as a percentage of a total shield gas volume than the first shield gas and the second cutting speed being slower than the first cutting speed.

13. The component of claim 12, the cutting information further comprising instructions such that when a hole is cut the control unit controls the second shield gas composition according to a ratio of a diameter of the hole to the thickness of the workpiece.

* * * * *

UNITED STATES PATENT AND TRADEMARK OFFICE
CERTIFICATE OF CORRECTION

PATENT NO. : 8,354,610 B2  
APPLICATION NO. : 13/248949  
DATED : January 15, 2013  
INVENTOR(S) : Jon W. Lindsay and Guy T. Best Page 1 of 1

It is certified that error appears in the above-identified patent and that said Letters Patent is hereby corrected as shown below:

In claim 6, at column 12, line 6, amend "percentage of a total shield as volume than the" to --percentage of a total shield gas volume than the--.

Signed and Sealed this  
Twelfth Day of March, 2013

Teresa Stanek Rea  
*Acting Director of the United States Patent and Trademark Office*